(12) United States Patent
Mitsui

(10) Patent No.: US 8,045,807 B2
(45) Date of Patent: Oct. 25, 2011

(54) PATTERN EDGE DETECTING METHOD AND PATTERN EVALUATING METHOD

(75) Inventor: Tadashi Mitsui, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/564,515

(22) Filed: Sep. 22, 2009

(65) Prior Publication Data

US 2010/0303361 A1   Dec. 2, 2010

(30) Foreign Application Priority Data

May 29, 2009   (JP) .................. 2009-130061

(51) Int. Cl.
*G06K 9/48* (2006.01)
*H03F 7/00* (2006.01)
*H03F 3/04* (2006.01)

(52) U.S. Cl. ............ 382/199; 330/4.9; 330/299

(58) Field of Classification Search .......... 382/112, 382/141, 144, 145, 165, 170, 181, 199; 330/4.9, 330/250, 299; 332/102, 105, 110, 116, 130, 332/152; 329/301, 305, 314, 342, 362; 438/46, 438/63, 77, 967, 968
See application file for complete search history.

(56) References Cited

U.S. PATENT DOCUMENTS

| | | | |
|---|---|---|---|
| 7,679,055 B2 * | 3/2010 | Sutani et al. | 250/307 |
| 7,817,844 B2 * | 10/2010 | Kitamura et al. | 382/141 |
| 2003/0059104 A1 | 3/2003 | Mitsui | |

FOREIGN PATENT DOCUMENTS

| | | |
|---|---|---|
| JP | 09-174714 | 7/1997 |
| JP | 2003-178314 | 6/2003 |
| JP | 2005-296349 | 10/2005 |
| JP | 2006-234588 | 9/2006 |
| JP | 2006-275952 | 10/2006 |

\* cited by examiner

*Primary Examiner* — Abolfazl Tabatabai
(74) *Attorney, Agent, or Firm* — Finnegan, Henderson, Farabow, Garrett & Dunner, L.L.P.

(57) ABSTRACT

A pattern edge detecting method includes: detecting edge points in an image of an inspection pattern acquired from an imaging device; generating a plurality of edge lines from the edge points using a grouping process; generating a plurality of edge line group pairs, each composed of a combination of first and second edge line groups to be a candidate of any of one and the other of an outside edge and an inside edge of the inspection pattern, the generated edge lines being divided into two parts in different manners; performing shape matching between the first and second edge line groups for each edge line group pair; and specifying, as an edge of the inspection pattern, one of the first and second edge line groups constituting the edge line group pair whose matching score is best of matching scores of the edge line group pairs obtained during the shape matching.

12 Claims, 5 Drawing Sheets

| EDGE LINE GROUP PAIR | SHAPE COINCIDENCE DEGREE | DISPERSION VALUE |
|---|---|---|
| COMBINATION OF (EG1 TO EG8, EG9 TO EG16) | 0.533416 | 70.099947 |
| ANY COMBINATION OTHER THAN ABOVE COMBINATION | 0.244051 | 2460.8334574 |

FIG. 4

PATTERN EDGE DETECTING METHOD AND PATTERN EVALUATING METHOD

CROSS REFERENCE TO RELATED APPLICATION

This application claims benefit of priority under 35USC §119 to Japanese patent application No. 2009-130061, filed on May 29, 2009, the contents of which are incorporated by reference herein.

BACKGROUND OF THE INVENTION

1. Field of the Invention

The present invention relates to a pattern edge detecting method and a pattern evaluating method.

2. Related Background Art

A method for detecting an edge of an evaluation pattern and evaluating a shape of the pattern has been widely used in various industrial fields. For example, in order to manufacture a semiconductor device with a high yield ratio, it is required to precisely measure a fine pattern, which is formed by a photolithographic process, a film forming process, and an etching process. In the conventional art for a pattern measurement, the edge of a pattern is detected in an image obtained by an imaging device of a SEM type, which is called a critical dimension scanning electron microscope (CDSEM), the detected edge coordinates are digitized, and desired information for an evaluation pattern is obtained. As a method for detecting the edge of a pattern, a threshold method has been used in the conventional art. However, in addition to the threshold method, various detecting methods including an improved threshold method are proposed, and a CD of a pattern is measured using these methods (for example, Japanese Patent Laid-Open Pub. No. 1997-174714). In the description below, a problem in the conventional art that uses a pattern edge detecting method based on the threshold method is described, but the same problem may be generated even when the other edge detecting methods are used.

In a pattern edge detection using the threshold method, it is required to set a region called a region of interest (ROI) to a pattern. By designating a portion of a pattern whose edge is to be detected by the ROI, a desired measurement value is obtained based on the detected partial edge coordinates. On the assumption that a simple pattern, such as a line pattern, a space pattern or a hole pattern, exists in the ROI, an edge detecting process is executed. At this time, it is required to designate a pattern that exists in the ROI. When the ROI is set, ROI, an accurate pattern measurement is enabled. The reason is that an adaptable threshold method is different according to a kind of a pattern. In the case of a manual measurement, the ROI is generally set by a real-time operation of an operator. However, since it is difficult to visually differentiate a line pattern and a space pattern from image information, a time and effort are required to transmit information on an inspection pattern as an order to the operator. This situation is also applicable to the case of an automatic measurement. A pattern is measured using a coordinate value previously set in a recipe as ROI instead of real-time setting by the operator. The ROI is set by a recipe creator in preparing the recipe, and there remains a problem that the recipe creator is required to know information of a pattern in advance.

In order to resolve the above-described problem, by using a method disclosed in Japanese Patent Laid-Open Pub. No. 2006-234588, it may be conceivable to determine whether a pattern within a ROI is a line pattern or a space pattern by referring the pattern with design data thereof. However, even when this method is used, an assumed pattern does not always exist in the ROI. For example, when a pattern is omitted due to a manufacture failure of the pattern or the pattern is not resolved, there arises a problem that the edge may be erroneously detected.

Meanwhile, a method for detecting the edge of a pattern without the ROI is also proposed (for example, Japanese Patent Laid-Open Pub. No. 2003-178314). The method disclosed in Japanese Patent Laid-Open Pub. No. 2003-178314 has an advantage that the entire edge of a pattern as well as the local edge of the pattern can be detected without setting the ROI. However, if a method based on a kind of image filtering is used, two pairs of edges corresponding to a top edge and a bottom edge of the pattern may be detected. There is a problem that a desired pattern edge cannot be obtained so long as information on an inspection pattern is not referred to using any means.

SUMMARY OF THE INVENTION

In accordance with a first aspect of the present invention, there is provided a pattern edge detecting method comprising:

acquiring image data of an inspection pattern from an imaging device and detecting edge points in an image of the inspection pattern;

generating a plurality of edge lines from the edge points using a grouping process;

generating a plurality of edge line group pairs, each of which is composed of a combination of first and second edge line groups to be a candidate of any of one and the other of an outside edge and an inside edge of the inspection pattern to each other, dividing the plurality of generated edge lines into two parts in different manners;

performing shape matching between the first and second edge line groups for each edge line group pair, during the shape matching a matching score being obtained; and specifying, as an edge of the inspection pattern, one of the first and second edge line groups constituting the edge line group pair whose matching score is best of the matching scores of the edge line group pairs.

In accordance with a second aspect of the present invention, there is provided a pattern evaluating method comprising:

acquiring image data of an inspection pattern from an imaging device and detecting edge points in an image of the inspection pattern;

generating a plurality of edge lines from the edge points using a grouping process;

generating a plurality of edge line group pairs, each of which is composed of a combination of first and second edge line groups to be a candidate of any of one and the other of an outside edge and an inside edge of the inspection pattern to each other, dividing the plurality of generated edge lines into two parts in different manners;

performing shape matching between the first and second edge line groups for each edge line group pair, during the shape matching a matching score being obtained;

specifying, as an edge of the inspection pattern, one of the first and second edge line groups constituting the edge line group pair whose matching score is best of the matching scores of the edge line group pairs; and measuring the inspection pattern using information of the specified edge and evaluating the inspection pattern from a measurement result.

BRIEF DESCRIPTION OF THE DRAWINGS

FIG. 4 is a table illustrating a specific example of matching scores in shape matching;

DETAILED DESCRIPTION OF THE INVENTION

Hereinafter, embodiments of the present invention will be described in detail with reference to the accompanying drawings. In the description below, the case will be described as a specific example, in which image data of a fine pattern that is formed by a manufacturing process of a semiconductor device, such as a lithographic process or an etching process, is acquired by an imaging device, such as a CDSEM, and a pattern edge is detected. However, it should be noted that the present invention is not limited thereto and can be applied to all of pattern evaluations in a variety of other industrial fields. In the below embodiments, the case where an evaluation pattern is evaluated using a top-down SEM image obtained by the CDSEM is exemplified. However, the present invention is not limited thereto, and the present invention can be applied to an image that is obtained by any other device, such as an optical image acquiring device. In order to evaluate a fine pattern of a semiconductor with a high precision, however, the pattern image needs to be obtained with high magnification. Therefore, the SEM image is preferably used at a current point of time.

In this specification, an "edge" means a portion where brightness is locally varied in an image.

(1) First Embodiment

Figure 1:
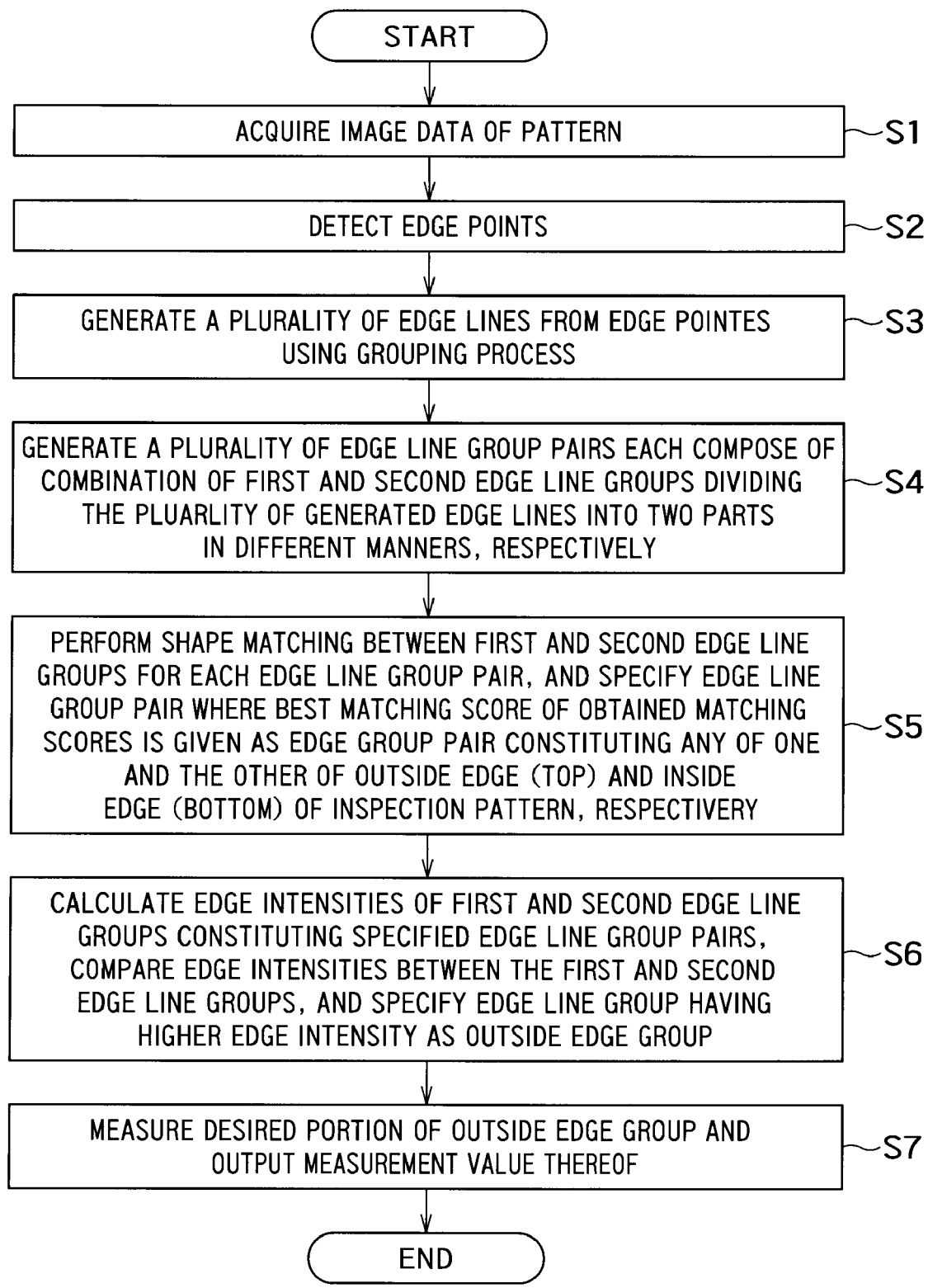
FIG. 1 is a flowchart illustrating a schematic sequence of a pattern edge detecting method according to a first embodiment of the present invention.

FIG. 1 is a flowchart illustrating a schematic sequence of a pattern edge detecting method according to a first embodiment of the present invention.

First, image data of an inspection pattern is acquired (step S1), and edge points of an image are detected (step S2).

Next, by using a grouping process, the detected edge points are classified into groups where the edge points are continuous as edge lines, to generate a plurality of edge lines (step S3).

Next, a plurality of pairs of edge line groups (hereinafter, simply referred to as "edge line group pair"), each of which is composed of a combination of first and second edge line groups, are generated by combining the plurality of generated edge lines such that the edge lines are divided into two parts in different manners, respectively (step S4).

Subsequently, shape matching is performed between the first and second edge line groups for each edge line group pair, a matching score is obtained for each shape matching, and an edge line group pair whose matching score is best of the obtained matching scores is specified as an edge line group pair constituting any of one and the other of an outside edge (top) and an inside edge (bottom) of the inspection pattern, respectively (step S5).

Further, edge intensities are calculated with respect to the first and second edge line groups constituting the specified edge line group pair, respectively, the calculated edge intensities are then compared with each other, and the edge line group having the higher edge intensity is specified as an outside edge group (step S6).

Thereafter, a measurement of a portion needed for the specified outside edge group is executed, thus a desired measurement value can be obtained (step S7).

Next, the sequence will be specifically described with reference to FIGS. 2 to 5.

Figure 2:
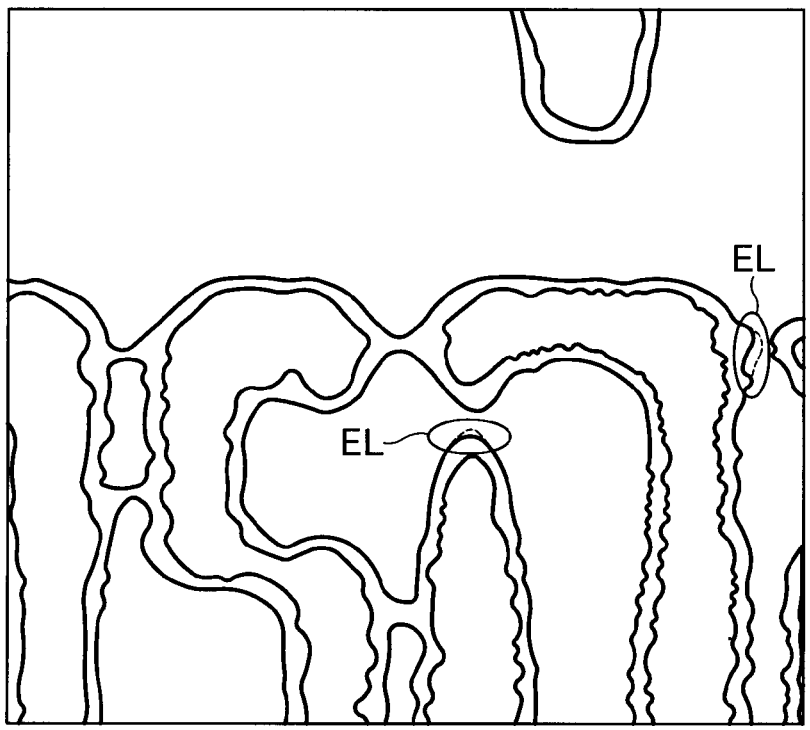
FIG. 2 is a diagram schematically illustrating an example where edge points are detected from image data of a SEM image of an inspection pattern.

FIG. 2 schematically illustrates an example where a SEM image is acquired with respect to any inspection pattern and edge points are detected from image data of the SEM image. In FIG. 2, a solid line indicates a set of the detected edge points, and a broken line in an elliptical EL indicates a set of pixels that is not detected as the edge.

In this embodiment, the edge points are detected using a Sobel filter. The Sobel filter is a process that outputs a total value of results obtained by multiplying 9 pixel values in all directions around any attention pixel in the case of a size 3 by weighting coefficients, respectively. This process is executed using a coefficient matrix in two directions of vertical and horizontal directions, in the case of detecting the edge. The value obtained in the above way is determined using a prescribed threshold value, and edge points are thus detected. In this embodiment, the Sobel filter corresponds to an edge extracting filter.

Since the detection of the edge points is one of basic techniques in image processing, a large number of methods are proposed, in addition to the Sobel filter. In this case, as long as the edge intensity of each edge point is output as a numerical value, any of edge detecting methods other than the Sobel filter may be used.

The grouping process of step S3 is a process that classifies the detected edge points into groups of successive edge points as edge lines. As an example of the grouping process, various methods exist, in addition to a method in which adjacent edge points are simply specified as being included in the same group. For example, according to a method that is disclosed in Japanese Patent Laid-Open Pub. No. 2005-296349, an edge line is extracted by linearly grouping edge points. In this embodiment, when an attention is focused on two specific edge points in a set of edge points and a distance between the edge points is smaller than or equal to a certain value, a process that regards the edge points as being included in the same group is executed. Thereby, the set of detected edge points is determined as a set of edge points that belong to one or a plurality of groups.

Figure 3:
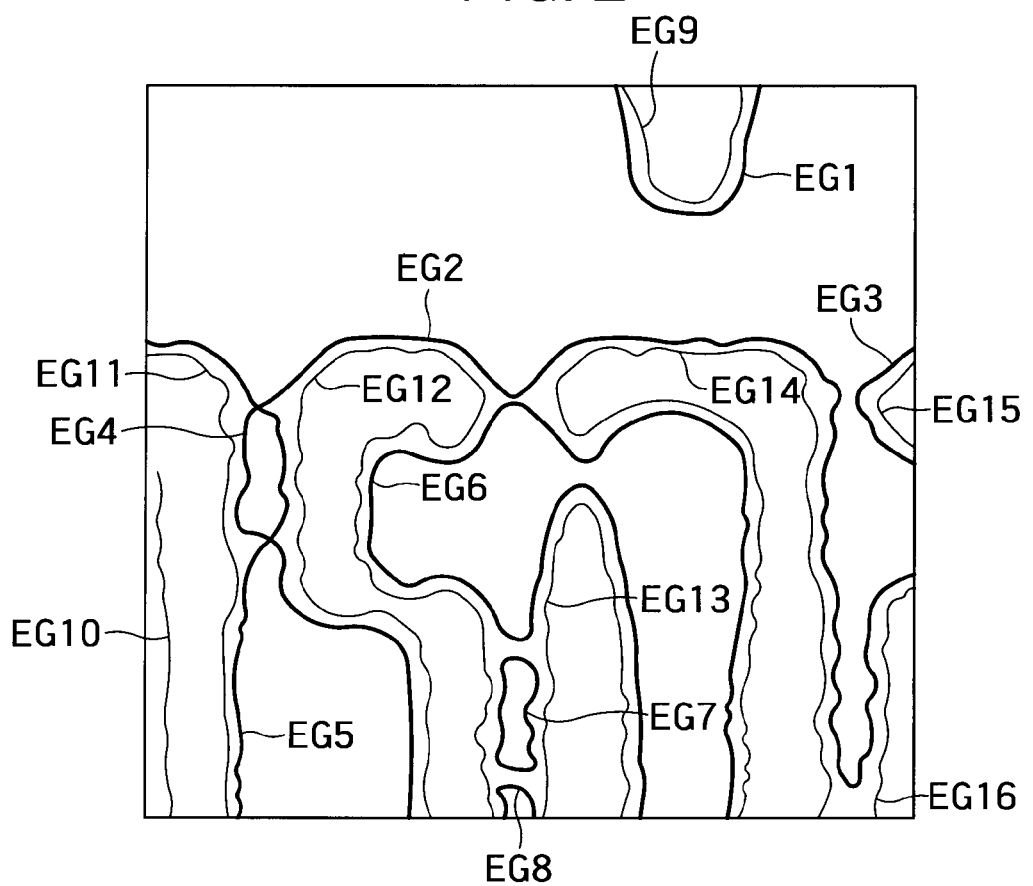
FIG. 3 is a diagram schematically illustrating only edge lines that are extracted by executing a grouping process on the edge points illustrated in FIG. 2.

FIG. 3 schematically illustrates only edge lines that are extracted by executing a grouping process on the edge points illustrated in FIG. 2. In FIG. 2, 16 edge lines are generated as denoted by reference numerals of EG1 to EG16.

Next, the sequences of steps S4 and S5 of FIG. 1 will be specifically described.

In the edge line group that is generated by the process of step S3, inside edges that are located at a top portion of the pattern and outside edges that are located at a bottom portion thereof are mixed. Accordingly, it is required to accurately determine which edge line belongs to a group of inside edges and which edge line belongs to a group of outside edges, among the edge lines generated by the grouping process. In an example illustrated in FIG. 3, by simple arithmetic, 16 edge lines exist, $2^{16} = 65536$ combinations exist, in the case where the edge lines are divided into two parts of an inside edge group and an outside edge group.

In this embodiment, as an index used to determine correctness of a combination, matching scores that are obtained by performing shape matching between an inside edge group and an outside edge group are used. That is, on the presumption that the shapes of the inside edge group and the outside edge group are similar to each other, among all combinations, a combination where a best matching score is given is specified as a correct combination.

Specifically, in the sequence of step S4 of FIG. 1, the plurality of edge lines that are generated in step S3 are divided into two parts, and edge line groups where one part is used as a first edge line group and the other part is used as a second edge line group are combined, and an edge line group pair is generated (step S4). At this time, edge line groups are combined while changing manners that divide the plurality of edge lines into two parts, respectively, thereby generating a plurality of edge line group pairs. In this case, the first edge line group becomes a candidate of any one of an outside edge and an inside edge of an inspection pattern, and the second edge line group becomes a candidate of the other of an outside edge and an inside edge of an inspection pattern.

Next, in the sequence of step S5 of FIG. 1, for each of the generated edge line group pairs, shape matching is performed between a first edge line group and a second edge line group constituting each pair. In this embodiment, a method that is disclosed in Japanese Patent Laid-Open Pub. No. 2006-275952 is used as the matching method. In the method that is disclosed in Japanese Patent Laid-Open Pub. No. 2006-275952, a shape coincidence degree and a dispersion value are used as matching scores. By this reference, the entire contents of Japanese Patent Laid-Open Pub. No. 2006-275952 is incorporated in this specification. However, the shape matching method is not limited thereto, and any other shape matching methods may be used, and any values according to the corresponding methods may be used as matching scores.

FIG. 4 is a table illustrating a comparison result of a score example of a correct combination and a score example of an incorrect combination, among matching scores of each edge line group pair. In an edge line group pair of a combination where the edge lines EG1 to EG8 are included in a first group and the edge lines EG9 to EG16 are included in a second group, among the edge lines EG1 to EG16 of FIG. 3, a shape coincidence degree=0.533416 and a dispersion value=70.099947 are obtained as matching scores.

Meanwhile, in FIG. 4, as an incorrect combination, a combination of a shape coincidence degree=0.244051 and a dispersion value=2460.834574 is exemplified. In this example, the shape coincidence degree is small and the dispersion value is decreased. As such, according to this embodiment, a correct combination can be derived from a number of combinations of outside edge groups and inside edge groups.

By the method using the scores of the shape matching mentioned above, an edge line group pair of a correct combination can be specified. However, if this method is used, it is impossible to know which edge line group is an outside edge group and which edge line group is an inside edge group between the first and second edge line groups constituting the specified edge line group pair. Thus, in step S6, first, the edge intensities of the first and second edge line groups are calculated, respectively. Here, the edge intensity may be defined by any arbitrarily index, as long as it indicates clearness or variation of the edge. For example, in the case of detecting the edge using the Sobel filter, if an average value of output values (intensity values in this case) of the individual edge points belonging to the edge group, which are obtained by a Sobel operator, is adopted as an index, the edge intensities of the two edge groups can be calculated.

Figure 5:
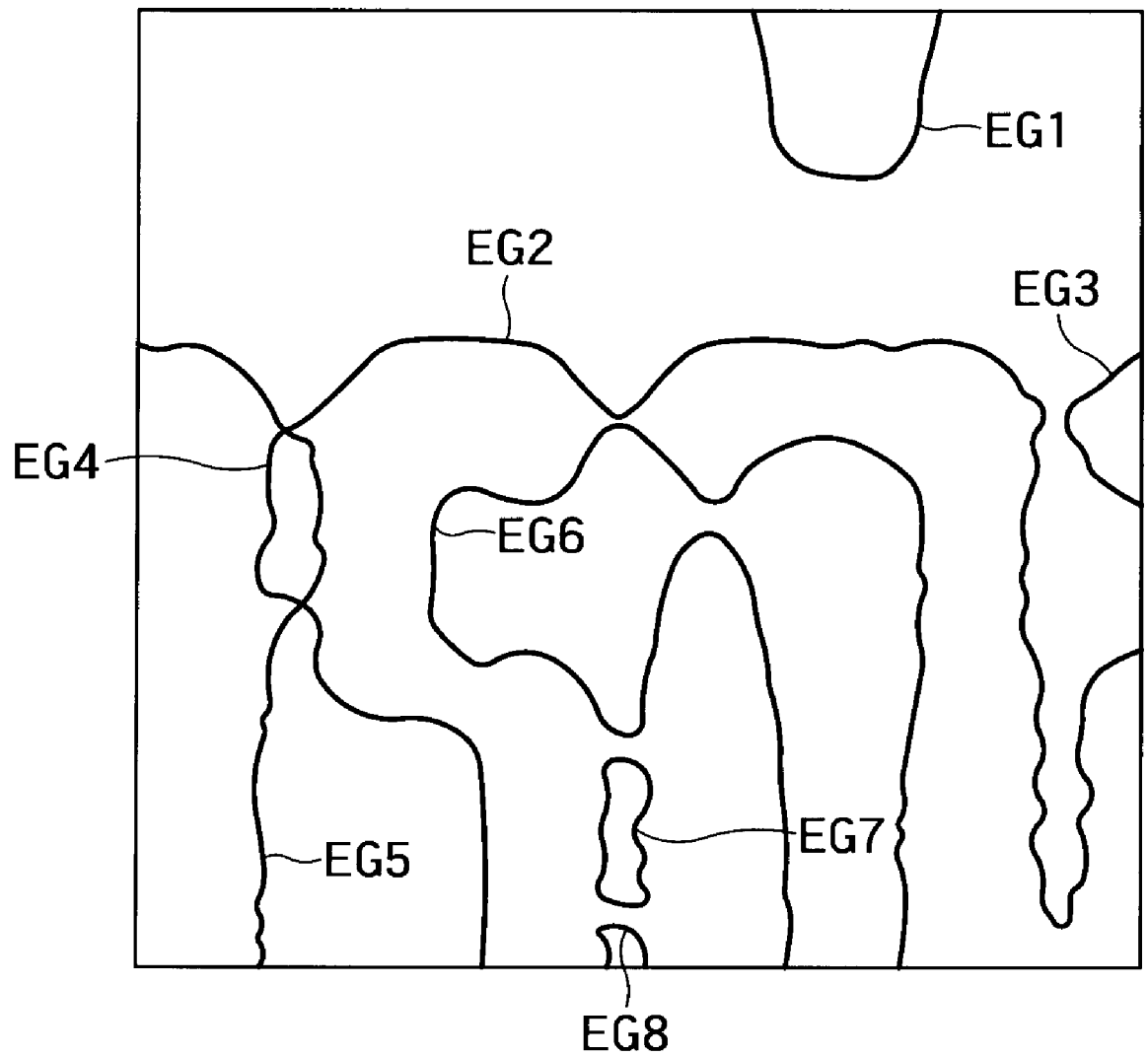
FIG. 5 is a diagram illustrating an extraction result of edge lines that belong to an outside edge group among the edge lines of FIG. 3.

Of a top edge and a bottom edge of a pattern, the bottom edge is generally clearer than the top edge, thus the edge group having the higher edge intensity can be regarded as the outside edge group. Although there is a case in which the edge line group having the higher edge intensity should be specified as the inside edge group in accordance with a product, the outside edge of the pattern is generally used as an external shape of the pattern. FIG. 5 schematically illustrates an outside edge group that is obtained by executing processes according to the series of sequences with respect to the image of FIG. 2.

Finally, if a needed portion is measured with respect to the obtained outside edge group and a measurement result is digitized (step S7 in FIG. 1), a desired measurement value can be obtained, and an inspection pattern can be evaluated from the obtained measurement value.

As such, according to this embodiment, an external shape of a fine pattern of an inspection pattern can be obtained without preparing information, such as design data or image data obtained from a good product, which is related to the inspection pattern. As a result, a pattern measurement can be performed with high precision.

(2) Second Embodiment

Figure 6:
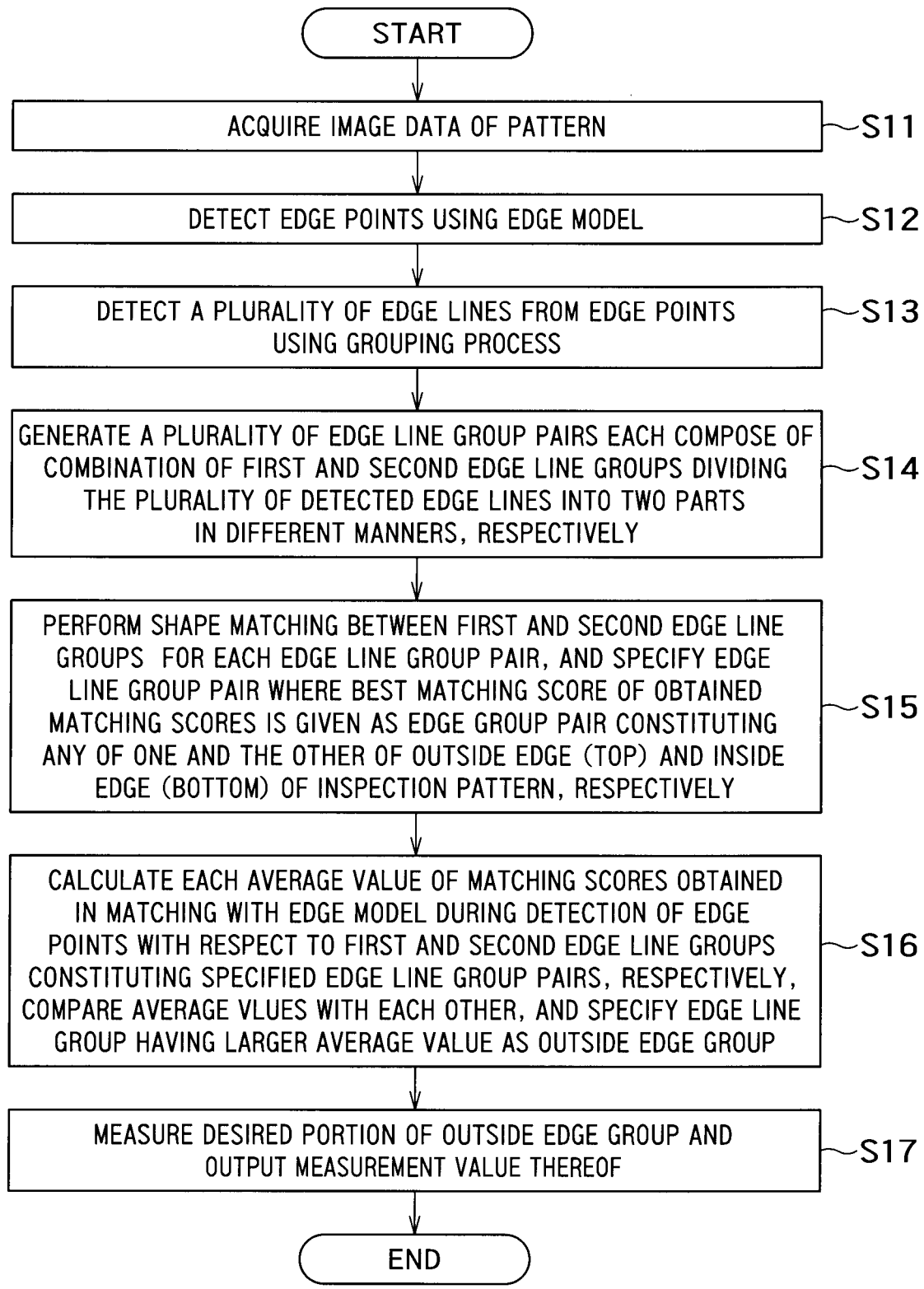
FIG. 6 is a flowchart illustrating a schematic sequence of a pattern edge detecting method according to a second embodiment of the present invention.

FIG. 6 is a flowchart illustrating a schematic sequence of a pattern edge detecting method according to a second embodiment of the present invention. As apparent from the comparison of FIGS. 1 and 6, the second embodiment is different from the first embodiment in sequences of steps S12 and S16, and the other sequences are substantially the same as those sequences of FIG. 1, whose numbers correspond to those obtained by simply adding 10 to the numbers of FIG. 1, respectively. Accordingly, in the description below, the sequences of steps S12 and 16 will be mainly described.

In the first embodiment, when the edge points are detected from the pattern image, the Sobel filter is used. However, in this embodiment, the edge points are detected using the edge model that is disclosed in Japanese Patent Laid-Open Pub. No. 2003-178314 (step S12). By this reference, the entire contents of Japanese Patent Laid-Open Pub. No. 2003-178314 is incorporated in this specification.

In addition, the matching scores are obtained between the edge points of the pattern image and the edge model during detection of the edge points. In this embodiment, the matching scores in detecting the edge points are previously added to coordinate information of the individual edge points and are used for discriminating the outside edge group and the inside edge group.

Specifically, by the sequence of step S15, the edge line group pair where the best matching score is given is specified as the edge line group pair that constitutes any of one and the other of the outside edge (top) and the inside edge (bottom) of the inspection pattern, respectively. Then, with respect to the first and second edge line groups constituting the specified edge line group pairs, each average value of the matching scores obtained in matching with the edge model during detection of the edge points is calculated. The calculated average values are then compared with each other. Also in this embodiment, the larger is the average value of the matching scores, the higher is the edge intensity. Thus, the edge line group having the larger average value is specified as the outside edge group.

According to this embodiment, the edge points are detected using the edge model, and the determination of the inside edge or the outside edge is performed by using the matching scores obtained in the matching with the edge model during the detection of the edge points. Accordingly, the pattern edge can be quickly and accurately detected.

What is claimed is:

1. A computer-implemented pattern edge detecting method comprising:
 acquiring image data of an inspection pattern from an imaging device and detecting edge points in an image of the inspection pattern;
 generating, by a computer, a plurality of edge lines from the edge points using a grouping process;
 generating, by a computer, a plurality of edge line group pairs, each of which is composed of a combination of first and second edge line groups to be a candidate of any of one and the other of an outside edge and an inside edge of the inspection pattern to each other, dividing the plurality of generated edge lines into two parts in different manners;
 performing, by a computer, shape matching between the first and second edge line groups for each edge line group pair, during the shape matching a matching score being obtained; and
 specifying, by a computer, as an edge of the inspection pattern, one of the first and second edge line groups constituting the edge line group pair whose matching score is best of the matching scores of the edge line group pairs.

2. The pattern edge detecting method according to claim 1, wherein the edge points are detected using an edge extracting filter.

3. The pattern edge detecting method according to claim 1, wherein the shape matching is performed using a shape coincidence degree as an index, and
 the best matching score is a maximum shape coincidence degree.

4. The pattern edge detecting method according to claim 1, wherein the shape matching is performed using a shape dispersion value as an index, and
 the best matching score is a minimum dispersion value.

5. The pattern edge detecting method according to claim 1, wherein average values of intensities of the edge points are calculated with respect to the first and second edge line groups constituting the edge line group pair whose matching score is best, and any of the first and second edge line groups whose average value of the intensities of the edge points is larger or smaller between the calculated average values is specified as an edge of the inspection pattern.

6. The pattern edge detecting method according to claim 1, wherein the edge points are detected by matching with an edge model, and
 average values of the matching scores obtained during matching with the edge model are calculated with respect to the first and second edge line groups constituting the edge line group pair whose matching score is best, and any of the first and second edge line groups whose average value of the matching score is larger or smaller between the calculated average values is specified as an edge of the inspection pattern.

7. A computer-implemented pattern evaluating method comprising:
 acquiring image data of an inspection pattern from an imaging device and detecting edge points in an image of the inspection pattern;
 generating, by a computer, a plurality of edge lines from the edge points using a grouping process;
 generating, by a computer, a plurality of edge line group pairs, each of which is composed of a combination of first and second edge line groups to be a candidate of any of one and the other of an outside edge and an inside edge of the inspection pattern to each other, dividing the plurality of generated edge lines into two parts in different manners;
 performing, by a computer, shape matching between the first and second edge line groups for each edge line group pair, during the shape matching a matching score being obtained;
 specifying, by a computer, as an edge of the inspection pattern, one of the first and second edge line groups constituting the edge line group pair whose matching score is best of the matching scores of the edge line group pairs; and
 measuring, by a computer, the inspection pattern using information of the specified edge and evaluating the inspection pattern from a measurement result.

8. The pattern evaluating method according to claim 7, wherein the edge points are detected using an edge extracting filter.

9. The pattern evaluating method according to claim 7, wherein the shape matching is performed using a shape coincidence degree as an index, and
 the best matching score is a maximum shape coincidence degree.

10. The pattern evaluating method according to claim 7, wherein the shape matching is performed using a shape dispersion value as an index, and
 the best matching score is a minimum dispersion value.

11. The pattern evaluating method according to claim 7, wherein average values of intensities of the edge points are calculated with respect to the first and second edge line groups constituting the edge line group pair whose matching score is best, and any of the first and second edge line groups whose average value of the intensities of the edge points is larger or smaller between the calculated average values is specified as an edge of the inspection pattern.

12. The pattern evaluating method according to claim 7, wherein the edge points are detected by matching with an edge model, and
 average values of the matching scores obtained during matching with the edge model are calculated with respect to the first and second edge line groups constituting the edge line group pair whose matching score is best, and any of the first and second edge line groups whose average value of the matching score is larger or smaller between the calculated average values is specified as an edge of the inspection pattern.

\* \* \* \* \*